US009963977B2

(12) United States Patent
Suciu et al.

(10) Patent No.: US 9,963,977 B2
(45) Date of Patent: May 8, 2018

(54) ADVANCED GAMMA TIAL COMPONENTS

(71) Applicant: UNITED TECHNOLOGIES CORPORATION, Hartford, CT (US)

(72) Inventors: Gabriel L. Suciu, Glastonbury, CT (US); James D. Hill, Tolland, CT (US); Gopal Das, Simsbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 424 days.

(21) Appl. No.: 14/868,903

(22) Filed: Sep. 29, 2015

(65) Prior Publication Data

US 2016/0186578 A1    Jun. 30, 2016

Related U.S. Application Data

(60) Provisional application No. 62/056,913, filed on Sep. 29, 2014.

(51) Int. Cl.

| *F01D 5/28* | (2006.01) |
| *F01D 5/02* | (2006.01) |
| *F01D 5/14* | (2006.01) |

(52) U.S. Cl.
CPC ............... *F01D 5/28* (2013.01); *F01D 5/02* (2013.01); *F01D 5/147* (2013.01); *F05D 2230/23* (2013.01); *F05D 2230/60* (2013.01); *F05D 2240/24* (2013.01); *F05D 2300/174* (2013.01); *F05D 2300/5023* (2013.01); *Y02T 50/671* (2013.01)

(58) Field of Classification Search
CPC ... F01D 5/28; F01D 5/02; F01D 5/147; F05D 2300/5023; F05D 2330/23; F05D 2330/60; F05D 2240/24; F05D 2300/174; Y02T 50/671
See application file for complete search history.

(56) References Cited

U.S. PATENT DOCUMENTS

| 5,634,992 A | * | 6/1997 | Kelly | ............... | C22F 1/183 148/669 |
| 5,653,828 A | | 8/1997 | Zhao et al. | | |
| 7,479,194 B2 | | 1/2009 | DeLuca | | |
| 7,923,127 B2 | | 4/2011 | Das | | |
| 9,551,231 B2 | * | 1/2017 | Steinhardt | ............. | F01D 5/3092 |
| 2011/0189026 A1 | * | 8/2011 | Smarsly | .................. | C22F 1/183 416/241 R |
| 2012/0048430 A1 | * | 3/2012 | Das | ........................... | B21J 1/00 148/557 |
| 2013/0251537 A1 | * | 9/2013 | Weimer | ................... | C22C 1/02 416/241 R |
| 2014/0130479 A1 | | 5/2014 | Schwarz et al. | | |
| 2015/0086414 A1 | * | 3/2015 | Smarsly | .................... | C22C 1/02 420/418 |
| 2015/0129583 A1 | * | 5/2015 | Richter | ............. | B23K 26/0006 219/601 |

FOREIGN PATENT DOCUMENTS

| DE | 102007051499 A1 | 4/2009 |
| EP | 0592189 A1 | 4/1994 |
| EP | 0889143 A1 | 1/1999 |
| EP | 0980962 A2 | 2/2000 |
| EP | 2423340 A1 | 2/2012 |

OTHER PUBLICATIONS

Imaev, V.M., Imaev, R.M., Oleneva, T.I., and Khismatullin, T.G., Microstructure and Mechanical Properties of the Intermetallic Alloy Ti-45Al-6(Nb, Mo)-0.2B, The Physics of Metals and Metallography, vol. 106, No. 6, pp. 641-648, Dec. 1, 2008.
Extended European Search Report for European Application No. 15187445.0, dated Apr. 1, 2016, 6 pages.
Emanuel Schwaighofer et al. "Microstructural Design and Mechanical Properties of a Cast and Heat-Treated Intermetallic Multi-Phase γ-TiAl Based Alloy", Sep. 10, 2013, 33 pages.

* cited by examiner

*Primary Examiner* — Richard Edgar
(74) *Attorney, Agent, or Firm* — Kinney & Lange, P.A.

(57) ABSTRACT

Components include a low pressure turbine having a plurality of rotor assemblies including a first gamma TiAl intermetallic blade having a maximum operating temperature over 1180° F. (638° C.). At least two of the rotor assemblies include gamma TiAl intermetallic alloy blades. In an embodiment, a method of making a turbine having a plurality of rotor assemblies includes attaching a first gamma TiAl intermetallic alloy blade to an upstream stage of the plurality of rotor assemblies.

18 Claims, 3 Drawing Sheets

US 9,963,977 B2

ADVANCED GAMMA TIAL COMPONENTS

CROSS-REFERENCE TO RELATED APPLICATION(S)

This application claims the benefit of U.S. Provisional Application No. 62/056,913, filed Sep. 29, 2014 for "ADVANCED GAMMA TiAl COMPONENTS" and is related to the following co-pending application that is filed on even date herewith and is assigned to the same assignee: HYBRID GAMMA TiAl ALLOY COMPONENT, Ser. No. 14/868,903.

BACKGROUND

The present invention relates to the utilization of lightweight, high temperature intermetallic compound alloys in gas turbine engines.

The efficiency of high performance gas turbine engines increases as the temperature difference between the inlet and exhaust temperatures increases. As a result, engine designers are continually raising the combustion and exhaust gas temperature of such engines. In addition to increased operating temperatures, there is also a large incentive to decrease the weight of the rotating components as much as possible, to increase the thrust to weight ratio of the engines, particularly for aerospace applications. Thus there is a desire to have components that are lighter than existing components.

Two phase gamma TiAl based intermetallic alloys have been considered as potential materials for aerospace and automotive applications, but their low ductility and fracture toughness have prevented them from being used in applications where components are subjected to localized stress, impact and vibration.

SUMMARY

Components include a low pressure turbine having a plurality of rotor assemblies including a first gamma TiAl intermetallic blade having a maximum operating temperature over 1180° F. (638° C.). At least two of the rotor assemblies include gamma TiAl intermetallic alloy blades.

In an embodiment, a method of making a turbine having a plurality of rotor assemblies includes attaching a first gamma TiAl intermetallic alloy blade to an upstream stage of the plurality of rotor assemblies.

DETAILED DESCRIPTION

Figure 1:
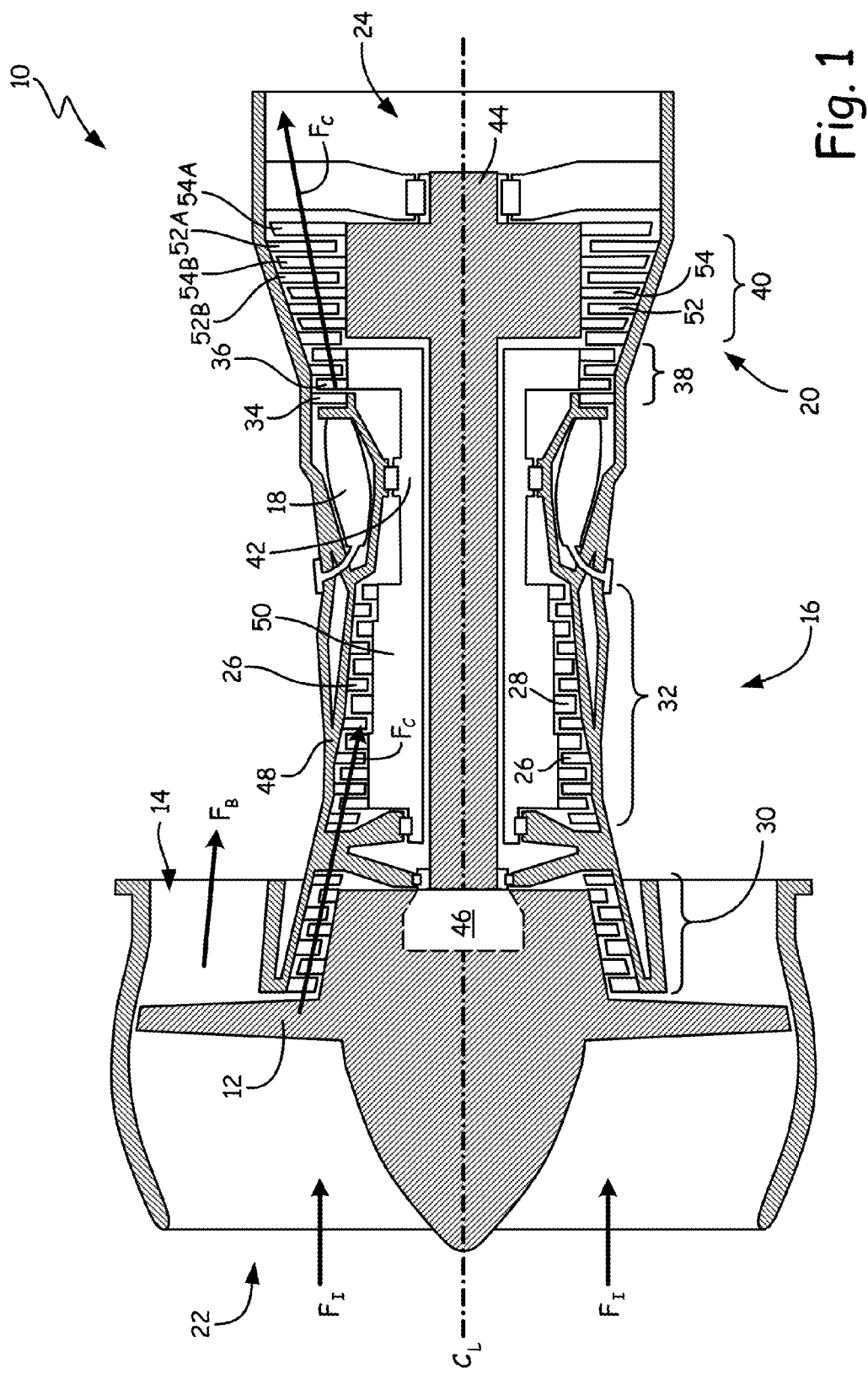
FIG. 1 illustrates a simplified cross sectional view of a gas turbine engine.

FIG. 1 is a cross-sectional view of gas turbine engine 10, in a turbofan exemplary embodiment in accordance with the present disclosure. As shown in FIG. 1, turbine engine 10 comprises fan 12 positioned in bypass duct 14, with bypass duct 14 oriented about a turbine core comprising compressor (compressor section) 16, combustor (or combustors) 18 and turbine (turbine section) 20, arranged in flow series with upstream inlet 22 and downstream exhaust 24.

Compressor 16 comprises stages of compressor vanes 26 and blades 28 arranged in low pressure compressor (LPC) section 30 and high pressure compressor (LPC) section 32. Turbine 20 comprises stages of turbine vanes 34 and turbine blades 36 arranged in high pressure turbine (HPT) section 38 and low pressure turbine (LPT) section 40. HPT section 38 is coupled to HPC section 32 via HPT shaft 50, forming the high pressure spool or high spool. LPT section 40 is coupled to LPC section 30 and fan 12 via LPT shaft 44, forming the low pressure spool or low spool. HPT shaft 42 and LPT shaft 44 are typically coaxially mounted, with the high and low spools independently rotating about turbine axis (centerline) $C_L$.

Fan 12 comprises a number of fan airfoils circumferentially arranged around a fan disk or other rotating member, which is coupled (directly or indirectly) to LPC section 30 and driven by LPT shaft 44. In some embodiments, fan 12 is coupled to the fan spool via geared fan drive mechanism 46, providing independent fan speed control.

As shown in FIG. 1, fan 12 is forward-mounted and provides thrust by accelerating flow downstream through bypass duct 14, for example in a high-bypass configuration suitable for commercial and regional jet aircraft operations. Alternatively, fan 12 is an unducted fan or propeller assembly, in either a forward or aft-mounted configuration. In these various embodiments turbine engine 10 may comprise any of, for example, a high-bypass turbofan, a low-bypass turbofan or a turboprop engine, and the number of spools and the shaft configurations may vary.

In operation of turbine engine 10, incoming airflow $F_I$ enters inlet 22 and divides into core flow $F_C$ and bypass flow $F_B$, downstream of fan 12. Core flow $F_C$ propagates along the core flowpath through compressor section 16, combustor 18 and turbine section 20, and bypass flow $F_B$ propagates along the bypass flowpath through bypass duct 14.

LPC section 30 and HPC section 32 of compressor 16 are utilized to compress incoming air for combustor 18, where fuel is introduced, mixed with air and ignited to produce hot combustion gas. Depending on embodiment, fan 12 also provides some degree of compression (or pre-compression) to core flow $F_C$, and LPC section 30 may be omitted. Alternatively, an additional intermediate spool is included, for example in a three-spool turboprop or turbofan configuration.

Combustion gas exits combustor 18 and enters HPT section 38 of turbine 20, encountering turbine vanes 34 and turbine blades 36. Turbine vanes 34 turn and accelerate the flow, and turbine blades 36 generate lift for conversion to rotational energy via HPT shaft 50, driving HPC section 32 of compressor 16 via HPT shaft 50. Partially expanded combustion gas transitions from HPT section 38 to LPT section 40 thereby encountering turbine vanes 52 and blades 54 driving LPC section 30 and fan 12 via LPT shaft 44. Vanes 52 are attached to casing 48. Exhaust flow exits LPT section 40 and turbine engine 10 via exhaust nozzle 24.

The thermodynamic efficiency of turbine engine 10 is tied to the overall pressure ratio, as defined between the delivery pressure at inlet 22 and the compressed air pressure entering combustor 18 from compressor section 16. In general, a higher pressure ratio offers increased efficiency and improved performance, including greater specific thrust. High pressure ratios also result in increased peak gas path temperatures, higher core pressure and greater flow rates, increasing thermal and mechanical stress on engine components.

Figure 2:
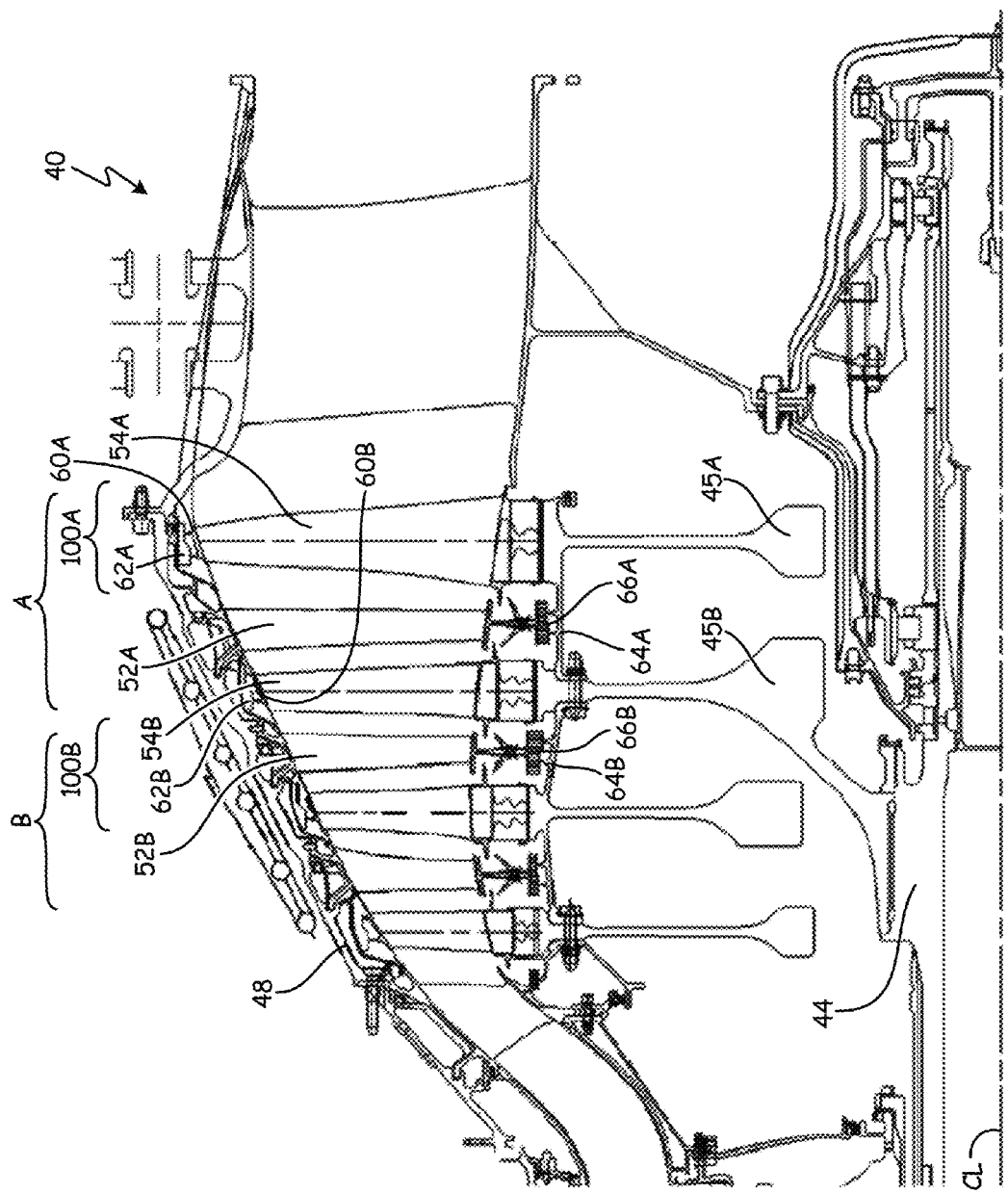
FIG. 2 is a cross sectional view of a low pressure turbine.

FIG. 2 is a cross sectional view of LPT 40. LPT 40 comprises a series of LPT stages wherein each stage comprises vanes mounted on and spaced circumferentially around casing 48 and blades mounted on and spaced circumferentially around the perimeter of disks 45 that are, in turn, mounted on shaft 44 on center line $C_L$ of LPT 40 as shown in FIG. 1. For example, LPT stage A shown in FIG. 2 comprises vane 52A mounted on casing 48 and rotor assembly 100A mounted on shaft 44. Rotor assembly 100A comprises blade 54A mounted on disk 45A. Rotor assembly 100A includes knife edges 60A that interact with seal 62A. Rotor assembly 100A further includes knife edges 64A that interact with seal 66A attached to vane 52A. During operation, vane 52A is stationary and blade 54A attached to disk 45A is rotatably attached to shaft 44 that rotates and is part of the low pressure spool as mentioned above. During operation, fixed vane 52A diverts the hot gas working fluid to impinge upon blade 54A in disk assembly 100A to cause rotation and to extract energy from the hot gas working fluid of engine 10. LPT stage 100B is similar to LPT stage 100A and includes vane 52B, blade 54B, disk 45B, and knife edges 62B and 64B interacting with seals 60B and 66B respectively.

Vanes 52 and blades 54 are typically cast from nickel base alloys. In embodiments of the present disclosure, the blades in, at least the last two rotor stages of LPT 40 are composed of a lighter, high temperature material in order to take advantage of the resulting weight reduction and increase in efficiency with minimal or no expense to the engine performance. The material of choice for this improvement is the intermetallic compound alloy, gamma TiAl. Gamma TiAl alloys have a density of about one-half to two-thirds of that of nickel base superalloys and melting points at or higher than the superalloys themselves.

An exemplary material for use in embodiments of the present invention is described in commonly owned U.S. Pub. No. 2012/0048430 which is hereby incorporated by reference in its entirety. The material is a new beta stabilized gamma TiAl alloy called TNM. The alloy has a composition of 42-45 at % Al, 3-5 at % Nb, 0.1-2 at % of Mo, 0.1-1.0 at % B and the balance titanium. Preferably, the alloy has a composition of 43.5 at % Al, 4.0 at % Nb, 1.0 at % Mo, 0.2 at % B and the balance titanium.

Components, (e.g., blades) can be formed from the alloy by a double vacuum arc remelting (VAR) casting technique. Following casting of ingots, a hot isostatic pressing (HIP) may be performed at a temperature from about 2100° F. (1149° C.) to 2240° F. (1227° C.) for a time in the range of 6 hours to 8 hours at a pressure in the range from 20 KSI (138 Mpa) to about 35 KSI (241 Mpa). The HIP step is performed to close porosity in the double VAR cast ingots.

The HIP'd ingots may then be isothermally forged at a temperature in the range of about 1850° F. (1010° C.) to about 2200° F. (1204° C.) into pancakes.

The forged pancakes may then be sliced into a plurality of rectangular blade blanks preferably by EDM machining.

Following EDM machining, the blanks may then be heat treated using a first heat treatment step at a temperature in the range of from about 2240° F. (1227° C.) to about 2300° F. (1260° C.) in the alpha plus gamma phase field for a time period in the range of from 1 hour to 2 hours. After the first heat treatment is completed, the blanks may be cooled to room temperature. An air cooling technique may be used to cool the blanks. Thereafter, a second heat treatment step is performed at a temperature in the range of from about 1550° F. (843° C.) to about 1700° F. (927° C.) for a time period in the range of from 4 hours to 6 hours in air. Thereafter the blanks may be furnace cooled to room temperature. This heat treatment was found to yield a duplex microstructure which may consist of gamma, phase, ($\alpha_2/\gamma$) lamellar colonies, and ($\beta/B_2$) phases.

Following heat treating, the blade blanks may then be electrochemical machined (ECM) to final blade configurations.

Figure 3:
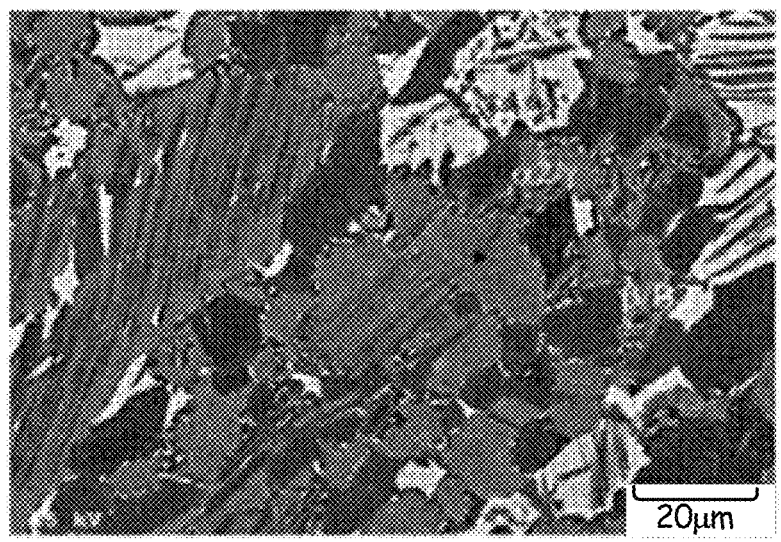
FIG. 3 is a scanning electron micrograph showing the microstructure of a heat treated cast-HIP'd-forged TNM alloy.

The microstructure of a heat treated forged and HIP'd TNM component of the current invention is shown in FIG. 3. The microstructure consists of 49 vol % gamma phase and 39 vol % of ($\alpha_2/\gamma$) lamellar colonies containing 12 vol % of ($\beta/B_2$) lamellar colonies as described in the above mentioned published patent application.

One benefit of inserting the TNM materials in LPT 40 is that the operating temperature may be increased by 100° F. to 150° F. compared to the operating temperature of current systems. For example, a maximum operating temperature of the first and second rotor assemblies may be about 1290° F. (699° C.) to about 1330° F. (721° C.) in some embodiments.

Another benefit concerns the speed and exit annular area of the LPT rotors of the invention. The performance of an LPT rotor can be related to the parameter $AN^2$ where A is the exit annular area of the rotor in question and N is the rotational speed of the airfoils. A is indicative of the mass exerted on the disk by the blades. N is indicative of the rotational centrifugal stress experienced by the rotor. Taken together, the parameter $AN^2$ is representative of the stress field experienced by the blade/disk combination and can be used to compare the loadings and stresses of different disks. For example, the last stage high speed rotors of the present disclosure have $AN^2$ in about the 5 to 7 (in·rpm)$^2$ (32-45 (cm·rpm)$^2$) range. Other engines may have $AN^2$ values in the 1.5 to 2 (in·rpm)$^2$ (9.7-12.9 (cm·rpm)$^2$) range.

In some embodiments, further improvements in the specific efficiency of the engine and decreased weight may be achieved by also incorporating lightweight hybrid gamma TiAl/superalloy vanes in the LPT. Lightweight hybrid vanes are described in U.S. application Ser. No. 62/056,908 entitled "HYBRID GAMMA TiAl ALLOY COMPONENT" filed on even date herewith and assigned to the same assignee as the present application. As described in that application, the hybrid vanes include gamma TiAl intermetallic airfoils bonded to metallic attachment and mounting features. The metallic attachment features may include nickel base alloys or other metals. Metal attachment and mounting features, such as hooks, are bonded to gamma TiAl airfoils by transient liquid phase (TLP) bonding. In TLP bonding, bonding material at a joint between, for instance, a gamma TiAl intermetallic airfoil and a nickel base alloy attachment feature such as a hook, melts during a heat treatment and isothermally solidifies at a temperature higher than the melting temperature of the bonding material to form a strong bond.

Benefits of the hybrid design include placing the bonds between a gamma TiAl airfoil and a metal attachment feature in positions of low stress and/or vibration in order to increase the service life of the hybrid component. The bonding materials may be Ti, Cu, Ni, Fe, Al, Cr, Nb, and mixtures thereof. The bonding materials may be in paste form, foil form, slurry forms or mixtures thereof.

Discussion of Possible Embodiments

The following are non-exclusive descriptions of possible embodiments of the present invention.

A turbine having a plurality of rotor assemblies includes a first gamma TiAl intermetallic alloy blade having a maximum operating temperature over 1180° F. (638° C.).

The turbine of preceding paragraph can optionally include, additional and/or alternatively any, one or more of the following features, configurations and/or additional components:

The maximum operating temperature may be over 1230° F. (666° C.).

The maximum operating temperature of the first blade may between about 1230° F. (666° C.) and about 1330° F. (721° C.).

The first blade may be operatively disposed in a last stage of the plurality of rotor assemblies.

The first blade may be operatively disposed in a next to last stage of the plurality of rotor assemblies.

The turbine may include at least one additional gamma TiAl intermetallic alloy blade having a maximum operating temperature over 1180° F. (638° C.), wherein the first and at least one of the additional blades are operatively disposed in respectively upstream stages of the plurality of rotor assemblies.

At least one additional blade includes at least three gamma TiAl intermetallic alloy blades, where each blade has a maximum operating temperature between about 1230° F. (666° C.) and about 1330° F. (721° C.).

The blades may be formed from forged gamma TiAl intermetallic alloy.

The gamma TiAl intermetallic alloy may have a composition of 42-45 at % Al, 3-5 at % Nb, 0.1-2 at % Mo, 0.1-1 at % B and the balance Ti.

The gamma TiAl intermetallic alloy may have a composition of 43.5 at % Al, 4.0 at % Nb, 1.0 at % Mo, 0.2 at % B and the balance Ti.

A last stage of the plurality of rotor assemblies may include a first blade with an annular exit area A configured to rotate at a rotational speed N and wherein $A*N^2$ is from between 5 and 7 $(in \cdot rpm)^2$ $(32\text{-}45 \ (cm \cdot rpm)^2)$ A method of making a turbine having a plurality of rotor assemblies may include: attaching a first gamma TiAl intermetallic alloy blade to an upstream stage of the plurality of rotor assemblies.

The method of the preceding paragraph can optionally include, additionally and/or alternatively any, one or more of the following features, configurations and/or additional components:

The first blade may have a maximum operating temperature between about 1230° F. (666° C.) and about 1330° F.). (721°.

The first blade may be forged from a gamma TiAl intermetallic alloy having a composition of 43.5 at % Al, 4.0 at % Nb, 1.0 at % Mo, 0.2 at % B and the balance Ti.

Forging may include isothermal forging at a temperature of between about 2100° F. (1149° C.) and about 2240° F. (1227° C.).

A plurality of additional gamma TiAl intermetallic alloy blades may be attached to additional upstream stages of the plurality of rotor assemblies with each additional blade having a maximum operating temperature between about 1230° F. (666° C.) and about 1330° F. (721° C.).

Hybrid vanes may be formed which include nickel alloy attachment and mounting features bonded to gamma TiAl intermetallic alloy airfoils.

The attachment and mounting features may include hooks and platforms.

Bonding may include isothermal transient liquid phase bonding.

The bonding materials may include a paste, foil, slurry or mixtures thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine having a plurality of rotor assemblies comprising:
    a first gamma TiAl intermetallic alloy blade having a maximum operating temperature over 1180° F. (638° C.); and
    hybrid vanes which include nickel alloy attachment and mounting features bonded to gamma TiAl intermetallic alloy airfoils, wherein bonding comprises isothermal transient liquid phase bonding.

2. The turbine of claim 1, wherein the maximum operating temperature is over 1230° F. (666° C.).

3. The turbine of claim 1, wherein maximum operating temperature of the first blade is between about 1230° F. (666° C.) and about 1330° F. (721° C.).

4. The turbine of claim 1, wherein the first blade is operatively disposed in a last stage of the plurality of rotor assemblies.

5. The turbine of claim 1, wherein the first blade is operatively disposed in a next to last stage of the plurality of rotor assemblies.

6. The turbine of claim 1, further comprising at least one additional gamma TiAl intermetallic alloy blade having a maximum operating temperature over 1180° F. (638° C.), wherein the first and at least one of the additional blades are operatively disposed in respective upstream stages of the plurality of rotor assemblies.

7. The turbine of claim 6, wherein at least one additional blade includes at least three gamma TiAl intermetallic alloy blades, each having a maximum operating temperature between about 1230° F. (666° C.) and about 1330° F. (721° C.).

8. The turbine of claim 6, wherein the blades are formed from forged gamma TiAl intermetallic alloy.

9. The turbine of claim 8, wherein the gamma TiAl intermetallic alloy has a composition of 42-45 at % Al, 3-5 at % Nb, 0.1-2 at % Mo, 0.1-1 at % B and the balance Ti.

10. The turbine of claim 9, wherein the gamma TiAl intermetallic alloy has a composition of 43.5 at % Al, 4.0 at % Nb, 1.0 at % Mo, 0.2 at % B and the balance Ti.

11. The turbine of claim 1, wherein a last stage of the plurality of rotor assemblies includes the first blade, has an exit annular area A, and is configured to rotate the first blade at a rotational speed N, and wherein $A*N^2$ is from between 5 and 7 $(in \cdot rpm)^2$ $(32\text{-}45 \ (cm \cdot rpm)^2)$.

12. A method of making a turbine having a plurality of rotor assemblies comprising:
    attaching a first gamma TiAl intermetallic alloy blade to an upstream stage of the plurality of rotor assemblies; and
    forming hybrid vanes which include nickel alloy attachment and mounting features bonded to gamma TiAl intermetallic alloy airfoils, wherein bonding comprises isothermal transient liquid phase bonding.

13. The method of claim 12, wherein the first blade has a maximum operating temperature between about 1230° F. (666° C.) and about 1330° F. (721° C.).

14. The method of claim 12, wherein the first blade is forged from a gamma TiAl intermetallic alloy having a composition of 43.5 at % Al, 4.0 at % Nb, 1.0 at % Mo, 0.2 at % B and the balance Ti.

15. The method of claim 14, wherein forging comprises isothermal forging at a temperature between about 2100° F. (1149° C.) and about 2240° F. (1227° C.).

16. The method of claim 12, further comprising attaching a plurality of additional gamma TiAl intermetallic alloy blades to additional upstream stages of the plurality of rotor assemblies with each additional blade having a maximum operating temperature between about 1230° F. (666° C.) and about 1330° F. (721° C.).

17. The method of claim 12, wherein the attachment and mounting features include hooks and platforms.

18. The method of claim 12, wherein the bonding materials comprise a paste, foil, slurry or mixtures thereof.

* * * * *

UNITED STATES PATENT AND TRADEMARK OFFICE
CERTIFICATE OF CORRECTION

PATENT NO. : 9,963,977 B2  
APPLICATION NO. : 14/868903  
DATED : May 8, 2018  
INVENTOR(S) : Gabriel L. Suciu et al.

Page 1 of 1

It is certified that error appears in the above-identified patent and that said Letters Patent is hereby corrected as shown below:

In the Specification

Column 4, Line 44:
Delete "metals. Metal"
Insert --metals. In an exemplary embodiment shown in FIG. 5, vane 52A is stationary and attached to casing 48 by metal attachment and mounting features, such as hooks 104 and 106. Metal--

Signed and Sealed this
Thirty-first Day of July, 2018

Andrei Iancu
*Director of the United States Patent and Trademark Office*